United States Patent
Poo (10) Patent No.: US 7,082,483 B2
(45) Date of Patent: Jul. 25, 2006

(54) SYSTEM AND APPARATUS FOR COMPRESSING AND DECOMPRESSING DATA STORED TO A PORTABLE DATA STORAGE DEVICE

(75) Inventor: Teng Pin Poo, Singapore (SG)

(73) Assignee: Trek Technology (Singapore) Pte. Ltd.

( * ) Notice: Subject to any disclaimer, the term of this patent is extended or adjusted under 35 U.S.C. 154(b) by 0 days.

(21) Appl. No.: 10/147,124

(22) Filed: May 16, 2002

(65) Prior Publication Data

US 2003/0217206 A1 Nov. 20, 2003

Related U.S. Application Data

(63) Continuation of application No. PCT/SG02/00086, filed on May 13, 2002.

(30) Foreign Application Priority Data

May 13, 2002 (WO) .................... PCT/SG02/00086

(51) Int. Cl.
*G06F 3/00* (2006.01)
*G06F 13/12* (2006.01)

(52) U.S. Cl. .............. 710/68; 710/8; 710/63; 710/72

(58) Field of Classification Search ......... 710/2, 710/8, 62, 63, 68, 74
See application file for complete search history.

(56) References Cited

U.S. PATENT DOCUMENTS

| | | | |
|---|---|---|---|
| 4,853,523 A | 8/1989 | Talmadge | |
| 4,988,855 A | 1/1991 | Iijima | |
| 5,291,584 A | 3/1994 | Challa et al. | |
| 5,297,148 A | 3/1994 | Harari et al. | |
| 5,375,243 A | 12/1994 | Parzych et al. | |
| 5,414,425 A * | 5/1995 | Whiting et al. | ............... 341/67 |
| 5,442,704 A | 8/1995 | Holtey | |
| 5,485,519 A | 1/1996 | Weiss | |
| 5,490,096 A | 2/1996 | Seto | |
| 5,517,014 A | 5/1996 | Iijima | |
| 5,583,538 A | 12/1996 | Watanabe et al. | |
| 5,588,146 A | 12/1996 | Leroux | |
| 5,621,798 A | 4/1997 | Aucsmith | |
| 5,646,646 A | 7/1997 | Inoue et al. | |
| 5,659,705 A | 8/1997 | McNutt et al. | |

(Continued)

FOREIGN PATENT DOCUMENTS

CA 2334113 4/1999

(Continued)

OTHER PUBLICATIONS

USBDrive professional, www.usbdrive.com, 1998-2003.*

(Continued)

*Primary Examiner*—Kim Huynh
*Assistant Examiner*—Alan Chen
(74) *Attorney, Agent, or Firm*—White & Case LLP (57) ABSTRACT

A portable memory device is provided that is capable of easy connection to a personal computer via a universal serial bus (USB) port, IEEE 1394 (i.e., firewire) or similar port. Included in the portable memory device is a compression/decompression engine capable of compressing and decompressing data. Data residing on a personal computer or other host platform is compressed by the engine and saved to the memory of the portable memory device. Compressed data is retrieved and decompressed by the engine and transmitted to the personal computer for use by the user. Embodiments of the present invention thus provide a highly convenient system and apparatus for users to access and save larger quantities of data to a relatively small device.

13 Claims, 4 Drawing Sheets

U.S. PATENT DOCUMENTS

| | | |
|---|---|---|
| 5,663,901 A | 9/1997 | Wallace et al. |
| 5,684,742 A | 11/1997 | Bublitz et al. |
| 5,760,986 A | 6/1998 | Morehouse et al. |
| 5,815,426 A | 9/1998 | Jigour et al. |
| 5,844,986 A | 12/1998 | Davis |
| 5,850,189 A | 12/1998 | Sakanaka et al. |
| 5,867,802 A | 2/1999 | Borza |
| 5,890,016 A | 3/1999 | Tso |
| 5,920,640 A | 7/1999 | Salatino et al. |
| 5,928,347 A | 7/1999 | Jones |
| 5,935,244 A | 8/1999 | Swamy et al. |
| 5,938,750 A | 8/1999 | Shaberman |
| 5,949,882 A | 9/1999 | Angelo |
| 5,969,750 A | 10/1999 | Hsieh et al. |
| 6,003,135 A | 12/1999 | Bialick et al. |
| 6,005,613 A | 12/1999 | Endsley et al. |
| 6,011,486 A | 1/2000 | Casey |
| 6,011,741 A | 1/2000 | Wallace et al. |
| 6,012,103 A | 1/2000 | Sartore et al. |
| 6,016,476 A | 1/2000 | Maes et al. |
| 6,016,530 A | 1/2000 | Auclair et al. |
| 6,016,553 A | 1/2000 | Schneider et al. |
| 6,027,375 A | 2/2000 | Wu |
| 6,038,320 A | 3/2000 | Miller |
| 6,038,640 A | 3/2000 | Terme |
| 6,044,428 A | 3/2000 | Rayabhari |
| 6,047,376 A | 4/2000 | Hosoe et al. |
| 6,058,441 A | 5/2000 | Shu |
| 6,067,625 A | 5/2000 | Ryu |
| 6,088,755 A | 7/2000 | Kobayashi et al. |
| 6,088,802 A | 7/2000 | Bialick et al. |
| 6,105,130 A | 8/2000 | Wu et al. |
| 6,116,006 A | 9/2000 | Killen et al. |
| 6,131,141 A | 10/2000 | Ravid |
| 6,145,045 A | 11/2000 | Falik et al. |
| 6,145,046 A | 11/2000 | Jones |
| 6,148,354 A | 11/2000 | Ban et al. |
| 6,151,069 A | 11/2000 | Dunton et al. |
| 6,151,657 A | 11/2000 | Sun et al. |
| 6,182,162 B1 | 1/2001 | Estakhri et al. |
| 6,199,122 B1 | 3/2001 | Kobayashi |
| 6,219,439 B1 | 4/2001 | Burger |
| 6,286,087 B1 | 9/2001 | Ito et al. |
| 6,300,976 B1 | 10/2001 | Fukuoka |
| 6,304,898 B1 | 10/2001 | Shiigi |
| 6,324,537 B1 | 11/2001 | Moran |
| 6,330,624 B1 | 12/2001 | Cromer et al. |
| 6,361,369 B1 | 3/2002 | Kondo et al. |
| 6,370,603 B1 | 4/2002 | Silverman et al. |
| 6,385,667 B1 | 5/2002 | Estakhri et al. |
| 6,385,677 B1 | 5/2002 | Yao |
| 6,446,118 B1 | 9/2002 | Gottlieb |
| 6,457,099 B1 | 9/2002 | Gilbert |
| 6,477,206 B1 | 11/2002 | Chatani |
| 6,490,163 B1 | 12/2002 | Pua et al. |
| 6,577,337 B1 | 6/2003 | Kang |
| 6,618,806 B1 | 9/2003 | Brown et al. |
| 6,628,325 B1 | 9/2003 | Steinberg et al. |
| 6,636,973 B1 | 10/2003 | Novoa et al. |
| 6,671,808 B1 | 12/2003 | Abbott et al. |
| 6,732,278 B1 | 5/2004 | Baird, III et al. |
| 6,748,541 B1 | 6/2004 | Margalit et al. |
| 6,763,399 B1 | 7/2004 | Margalit et al. |
| 6,766,456 B1 | 7/2004 | McKeeth |
| 6,799,275 B1 | 9/2004 | Bjorn |
| 2001/0009439 A1 | 7/2001 | Hwang |
| 2001/0016845 A1 | 8/2001 | Tribbensee |
| 2001/0029583 A1* | 10/2001 | Palatov et al. ............. 713/193 |
| 2001/0030827 A1* | 10/2001 | Morohashi ................. 360/69 |
| 2001/0047441 A1 | 11/2001 | Robertson |
| 2001/0048409 A1 | 12/2001 | Kim |
| 2001/0052541 A1 | 12/2001 | Kang et al. |
| 2002/0010857 A1 | 1/2002 | Karthik et al. |
| 2002/0029343 A1 | 3/2002 | Kurita et al. |
| 2002/0069237 A1 | 6/2002 | Ehara |
| 2002/0106933 A1 | 8/2002 | Lee |
| 2002/0107046 A1 | 8/2002 | Davis |
| 2002/0116565 A1 | 8/2002 | Wang et al. |
| 2002/0145507 A1 | 10/2002 | Foster |
| 2002/0147882 A1* | 10/2002 | Pua et al. ................... 711/103 |
| 2002/0151216 A1* | 10/2002 | Wei ............................ 439/607 |
| 2002/0167546 A1 | 11/2002 | Kimbell et al. |
| 2002/0174287 A1 | 11/2002 | Cheng |
| 2002/0194414 A1 | 12/2002 | Bateman et al. |
| 2003/0063196 A1 | 4/2003 | Palatov et al. |
| 2003/0103369 A1 | 6/2003 | Wu |
| 2003/0110371 A1 | 6/2003 | Yang et al. |
| 2003/0115415 A1 | 6/2003 | Want et al. |
| 2003/0157959 A1 | 8/2003 | Makela et al. |
| 2003/0163634 A1* | 8/2003 | Kim ........................... 711/103 |
| 2004/0236980 A1 | 11/2004 | Chen |

FOREIGN PATENT DOCUMENTS

| | | |
|---|---|---|
| CN | 99117225.6 | 4/2001 |
| DE | 37 06 466 A | 9/1988 |
| DE | 195 36 206 A1 | 4/1996 |
| DE | 196 45 937 A1 | 5/1998 |
| DE | 197 12 053 A1 | 9/1998 |
| DE | 100 57697 A1 | 5/2002 |
| EP | 0 152 024 B1 | 8/1985 |
| EP | 0 703 544 A | 3/1996 |
| EP | 0 856 818 A2 | 5/1998 |
| EP | 0 856 818 A3 | 5/1998 |
| EP | 0 883 083 A1 | 9/1998 |
| EP | 0 883 084 A2 | 12/1998 |
| EP | 0 924 656 A2 | 6/1999 |
| EP | 0 924 657 A2 | 6/1999 |
| EP | 0 929 043 A1 | 7/1999 |
| EP | 0945777 A3 | 9/1999 |
| EP | 1 030 494 A1 | 8/2000 |
| EP | 1 077 399 A2 | 2/2001 |
| EP | 1 100 000 A2 | 5/2001 |
| EP | 0 912 939 B1 | 9/2001 |
| EP | 1 146 559 A1 | 10/2001 |
| EP | 1139224 A2 | 10/2001 |
| EP | 1 156 697 A1 | 11/2001 |
| EP | 1 215 876 A1 | 6/2002 |
| GB | 2 204 971 A | 11/1988 |
| GB | 2 312 040 A | 10/1997 |
| JP | 9069067 | 3/1997 |
| JP | 11266384 A | 9/1999 |
| JP | 2000 048177 | 2/2000 |
| JP | 2000 20048 | 7/2000 |
| JP | 2000 200123 | 7/2000 |
| JP | 2000 209534 A | 7/2000 |
| JP | 2000 307911 | 11/2000 |
| JP | 2001 216099 | 8/2001 |
| JP | 2001 242965 A | 9/2001 |
| JP | 2001 290753 A | 10/2001 |
| JP | 2001 344173 | 12/2001 |
| JP | 2001 346075 | 12/2001 |
| JP | 2002 157195 | 5/2002 |
| JP | 2002 232769 A | 8/2002 |
| JP | 2002 359763 A | 12/2002 |
| JP | 2003 186782 A | 7/2003 |
| KR | 10-2000-0054614 | 9/2000 |
| KR | 2002 065497 A | 11/2002 |
| TW | 431101 | 4/2001 |
| TW | 439377 | 6/2001 |
| TW | 453071 | 9/2001 |
| WO | WO 87/07063 | 11/1987 |
| WO | WO 89/12287 A | 12/1989 |
| WO | WO 98/07255 | 2/1998 |

| | | |
|---|---|---|
| WO | WO 98/12670 | 3/1998 |
| WO | WO 98/13791 A | 4/1998 |
| WO | WO 98/38567 | 9/1998 |
| WO | WO 99/08238 | 2/1999 |
| WO | WO 99/13434 A1 | 3/1999 |
| WO | WO 99/16024 A1 | 4/1999 |
| WO | WO 99/56429 A1 | 4/1999 |
| WO | WO 99/40723 | 8/1999 |
| WO | WO 99/45460 | 9/1999 |
| WO | WO 99/63476 | 12/1999 |
| WO | WO 00/07387 | 2/2000 |
| WO | WO 00/28471 | 5/2000 |
| WO | WO 00/42491 | 7/2000 |
| WO | WO 00/60476 | 10/2000 |
| WO | WO 01/08055 A1 | 2/2001 |
| WO | WO 01/09845 A1 | 2/2001 |
| WO | WO 01/16917 A2 | 3/2001 |
| WO | WO 01/22351 | 3/2001 |
| WO | WO 01/23987 | 4/2001 |
| WO | WO 01/31577 A1 | 5/2001 |
| WO | WO 01/33317 A1 | 5/2001 |
| WO | WO 01/48612 A1 | 7/2001 |
| WO | WO 01/61692 A | 8/2001 |
| WO | WO 01/73570 A | 10/2001 |
| WO | WO 01/73570 A1 * | 10/2001 |
| WO | WO 01/86640 A | 11/2001 |

OTHER PUBLICATIONS

Trek's Thumb Drive Debuts at CeBit; The Business Times; Feb. 28, 2000.

Aladdin eToken and Rainbow iKey; Rainbow, date unknown.

Lexar JumpShot Cable, date unknown.

PCMCIA SRAM & Linear Flash Cards; C1-Tech, Simple Technology, Centennial, Intel, KingMax; date unknown; retrieved from the internet URL:http://www.psism.com/sram.htm ; 5 pages.

Pretec PCMCIA Type I SRAM 2048 KB; date unknown; retrieved from the internet URL:http://www.everythinglinux.com . . . /SRAM2M?elinux=e0c72135e544a6ea13772f5c23ba3f0 ; 1 page.

What is Memory Stick?; date unknown; retrieved from the internet URL:http://www.memorystick.org/topic/eng/aboutms/feat_outline.html ; 1 page.

Rajesh Gupta; Yervant Zorian; Introducing Core-Based System Design; IEEE; 1997; pp. 15-25.

CY7C63000, CY7C63001, CY7C63100, CY7C63101, CY7C63200, CY7C63201 Universal Serial Bus Microcontroller; Cypress; Jun. 26, 1997; 27 pages.

PC/104 PCMCIA Module, 1st Edition, Part No. 2007311000 Manual; Printed in Taiwan; Jul. 1997.

IBM Smart Card Solution Elements; IBM; Jul. 1997; pp. 1-24.

Interfacing the Intel Flash 28F001BX-T to Your 186 Based System; Intel; 1998; retrieved from the internet URL:http://developer.intel.com/design/intarch/applnots/2150.htm 14 pages.

SY-6IEB Main Board Quick Start Guide; SOYO Computer Inc.; Sep. 1998; pp. 3-14.

Universal Serial Bus Specification Revision 1.1; Compaq, Intel, Microsoft, NEC; Sep. 23, 1998.

Week of Oct. 19, 1998; Multimedia Work; Oct. 23, 1998; retrieved from internet URL:http://www.m2w.net/News/981019.html ; 10 pages.

Understanding the Flash Translation Layer (FTL) Specification; Intel; Dec. 1998.

SanDisk ImageMate USB Review ; Digital Eyes; copyright 1998-2001 ; retrieved from internet URL:http://www.image-acquire.com/articles/storage/sdimagematesub.shtml; 2 pages.

Tony K.P. Wong; An Embedded Chip for USB Application: from the Architecture to Implementation; International IC' 99 Conference Proceedings; Siemens; 1999; 10 pages.

AlphaPC 164LX Motherboard Product Brief; Alphaprocessor, Inc.; Jan. 1999; 2 pages.

Image Memory Card Reader SM-R1 Owner's Manual; FujiFilm; Apr. 1, 1999.

SanDisk ImageMate USB CF Card Reader; Feather River Canyon News; Jul. 12, 1999; retrieved from the internet URL:http://www.quicknet.com/~frcn/SanDiskUSB.html ; 3 pages.

Jeff Keller; DCRP Review: Fujifilm MX-2900; Digital Camera Resource Page; Jul. 27, 1999; retrieved from the internet URL:http://www.dcresource.com/reviews/fuji/mx2900-review/ ; 9 pages.

Matsushita Electric, Scandisk and Toshiba Agree Join Forces to Develop and Promote Next Generation Secure Memory Card; SD Card Association; Aug. 25, 1999; retrieved from internet URL:http://www.sdcard.org/press5.htm; 4 pages.

(BW) (CA—Rainbow—Technologies) (RNBO) Rainbow Technologies Forms New Joint Venture in China; Business Wire; Nov. 8, 1999; retrieved from the internet URL:http://www.businesswire.com/webbox/bw.110899/193120188.htm ; 2 pages.

Fuji Film SM-R1 Memory Card Reader; TwoMobile; Dec. 1999; retrieved from internet URL:http://www.twomobile.com/rev_smr1reader.html ; 3 pages.

Boot sequence [online]; Jan. 16, 2001 ; retrieved from the internet: URL:http://web.archive.org/web/2001011610440 0/www.pcguide.com/ref/mbsys/bios/set/adv_Boot.htm.

T. Fukagawa and M. Nagayama, "2001 edition of Hints on Use of PC—Release of Convincing Techniques and Useful Approaches to Using PC," *Touch PC*, Mainichi Communications, Inc., Mar. 24, 2001, vol. 6, No. 3, pp. 20-21.

SL11R USB Controller/16-Bit RISC Processor Data Sheet; Cypress Semiconductor Corporation; Dec. 3, 2001; 85 pages.

USB Support for Amibios8 [online]; American Megatrends; Oct. 16, 2002; retrieved from the internet: URL:http://www.ami.com/support/downloaddoc.cfm?DLFile=support/doc/AMIBIOS8_USB_Whitepaper.pdf&FileID=513; 12 pages.

SSFDC Forum; SSFDC Forum; Dec. 27, 2002; retrieved from internet URL:http://www.ssfdc.or.jp/english/ ; 1 page.

Mainboard D1307. Datasheet [online]; Fujitsu Siemens Computer, Mar. 2003; retrieved from the internet: URL:www.fujitsu-siemens.com.pl/_itemserver/dok_mainboard/datasheet_d1307.pdf ; 2 pages.

Concept of SPB-Linux-2 [online]; Mar. 24, 2003; retrieved from the internet: URL:http:web.archive.org/web/20030324012428/http://www.8ung.at/spblinux/concept.htm ; 3 pages.

Reference Design: SL11RIDE-Combo; Cypress; Jul. 10, 2003; retrieved from internet; 2 pages.

Availability of Universal Serial Bus Support in Windows 95; Oct. 7, 2003; retrieved from the internet URL:http://support.microsoft.com/default.aspx?scid=kb;en-us:253756 ; 3 pages.

U.S. Appl. No. 09/449,159, Abbott et al.

WIBU-Key User's Guide for Windows, DOS, OS/2 and MacOC on IBM Compatible PC's and Macintosh Version 2.5; Published Jul. 1998; obtained from company WIBU-Systems Germany.

Aladdin Announces eTóken "Next Generation Security Key Based on Universal Bus Port" San Jose, RSA Data Security Conference, Aladdin booth#238, Jan. 19, 1999 ,<Web document retrieved at http://www.aladdin.com/news/1999/etoken/etoken.asp>.

PocoMail PE v.2.63, Web Site Publication, Web Site states released Feb. 2002, http://poco.ca/press.html.

Aladdin Knowledge Systems, Inc.; MacHUSP USB; (advertising material); pp. 29-38.

Rogers, Sue; Techlink Seminar 3 New Mac Hardware and Peripherals; Nov. 19, 1999.

Universal Serial Bus Mass Storage Class Specification Overview; V 1.0 Revision; Oct. 22, 1998.

Universal Serial Bus Mass Storage Class / UFI Command Specification; Revision 1.0; Dec. 14, 1998.

Ziller, Jason and Fair, David; Which External I/O Bus Is Right For You?; Intel Corporation; Intel Developer UPDATE Magazine; Jan. 2000.

* cited by examiner

SYSTEM AND APPARATUS FOR COMPRESSING AND DECOMPRESSING DATA STORED TO A PORTABLE DATA STORAGE DEVICE

CROSS REFERENCE TO RELATED APPLICATIONS

The present application is a continuation of International Application No. PCT/SG02/00086 filed in Singapore on May 13, 2002 under 35 U.S.C. 111(a) and 37 CFR 1.53(b) and related to the following United States patent applications, each of which is owned by the assignee of the present invention and is incorporated by reference in its entirety herein:

U.S. patent application Ser. No. 09/803,173, entitled "PORTABLE DATA STORAGE DEVICE CAPABLE OF BEING DIRECTLY CONNECTED VIA USB PLUG TO A COMPUTER"; U.S. patent application Ser. No. 09/803,157, entitled "PORTABLE DATA STORAGE DEVICE HAVING SECURE MODE OF OPERATION"; U.S. patent application Ser. No. 09/898,365, entitled "A PORTABLE DEVICE HAVING BIOMETRICS-BASED AUTHENTICATION CAPABILITIES"; and U.S. patent application Ser. No. 09/898,310, entitled "A PORTABLE DEVICE HAVING BIOMETRICS-BASED AUTHENTICATION CAPABILITIES".

BACKGROUND OF THE INVENTION

1. Field of the Invention

The present invention relates to the field of storage of electronic data. More particularly, the present invention relates to the compression and decompression of data stored to a portable memory device.

2. Background of the Invention

Portable memory devices, sometimes referred to as "key chain" memory devices or Thumbdrives™ (which is a trademark of the assignee of the present invention), are small portable data storage devices. These devices have become a class of indispensable computer peripherals that are widely utilized in business, educational and home computing. These devices are very small in comparison with other data storage devices such as personal computers (PCs), personal digital assistants (PDAs), magnetic disks, or compact disks (CDs). Indeed, the name "keychain" memory device describes the devices as similar in size to a key. Portable memory devices are generally not permanently fitted to a particular host platform, such as a PC. Rather, they can be conveniently attached to and removed from any computer having the appropriate connection port (e.g., a serial bus port like a USB port, or IEEE 1394 port ("Firewire")). Thus, these portable data storage devices enable a user to transfer data among different computers that are not otherwise connected. Because these devices utilize a non-volatile solid-state memory (e.g., flash memory) as the storage medium, they do not require moving parts or a mechanical drive mechanism for accessing data. The absence of a drive mechanism enables portable data storage devices to be more compact than surface storage devices such as magnetic disks and CDs. Also, because there are no moving parts, reading and writing to the memory can be done much more rapidly than to magnetic disks and CDs. Portable data storage devices also have a much higher memory capacity than magnetic disks, holding up to 256 megabytes, as compared to 1.4 megabytes for magnetic disks.

Although storing data to a portable memory device has proven useful, the utility of these devices is limited by their inability to store larger quantities of data without increasing their size.

SUMMARY OF THE INVENTION

Accordingly, it is an object of the present invention to provide a system and apparatus that enables users to save larger quantities of data to a portable memory device than the current state of the art would allow. This would allow manufacturers to increase the amount of data that can be stored to the memory of these devices without increasing the physical size of the memory and thus the size of the devices. Additionally, this would have the added benefit of allowing manufacturers to decrease the size of these devices without decreasing the amount of data that such devices are capable of storing.

These and other objects are achieved by the present invention comprising a portable memory device that is capable of easy connection to a host platform such as a PC via a USB port, IEEE 1394 (i.e., firewire) or similar port. Included in the device is flash memory, read-only-memory (ROM), random-access-memory (RAM), USB controller, and a micro controller. In addition, a data compression and decompression engine is included in the portable memory device to compress/decompress data as it is stored and retrieved from memory.

The portable memory device (Thumbdrive™) is connected to a host platform such as a personal computer (PC) by a USB connector inserted into the PC's USB port. Data to be saved to the portable memory device is transmitted by the PC in the form of data packets to a working buffer in the portable memory device. The compression engine retrieves the data from the buffer and compresses each packet of data. Compressed data packets are stored in the flash memory. To retrieve data, the compression/decompression engine retrieves the data from the flash memory and decompresses it. The decompression engine places the decompressed data in the working buffer where it is then transferred to the host platform.

Typically, the compression/decompression software is located in the ROM then loaded into micro controller for execution. In an alternative embodiment, the compression/decompression engine resides in an ASIC chip in the portable device.

The compression/decompression features of the portable device are invisible to the user. The user saves data but is not aware that it is being compressed. In an alternative embodiment, the user is aware of these features and enables/disables the compression feature as desired. Disabling the compression feature has the effect of increasing the speed at which the data can be saved.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION OF THE INVENTION

The present invention will now be described more fully with reference to the accompanying drawings, in which preferred embodiments of the invention are shown. The present invention may, however, be embodied in many different forms and should not be construed as being limited to the embodiments set forth herein; rather these embodiments are provided so that this disclosure is thorough and complete and fully conveys the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it is clear to those of ordinary skill in the art that the present invention may be practiced without such specific details. In other instances, well known methods, procedures, components, and circuits have not been described in detail so as not to unnecessarily obscure aspects of the present invention.

Figure 1:
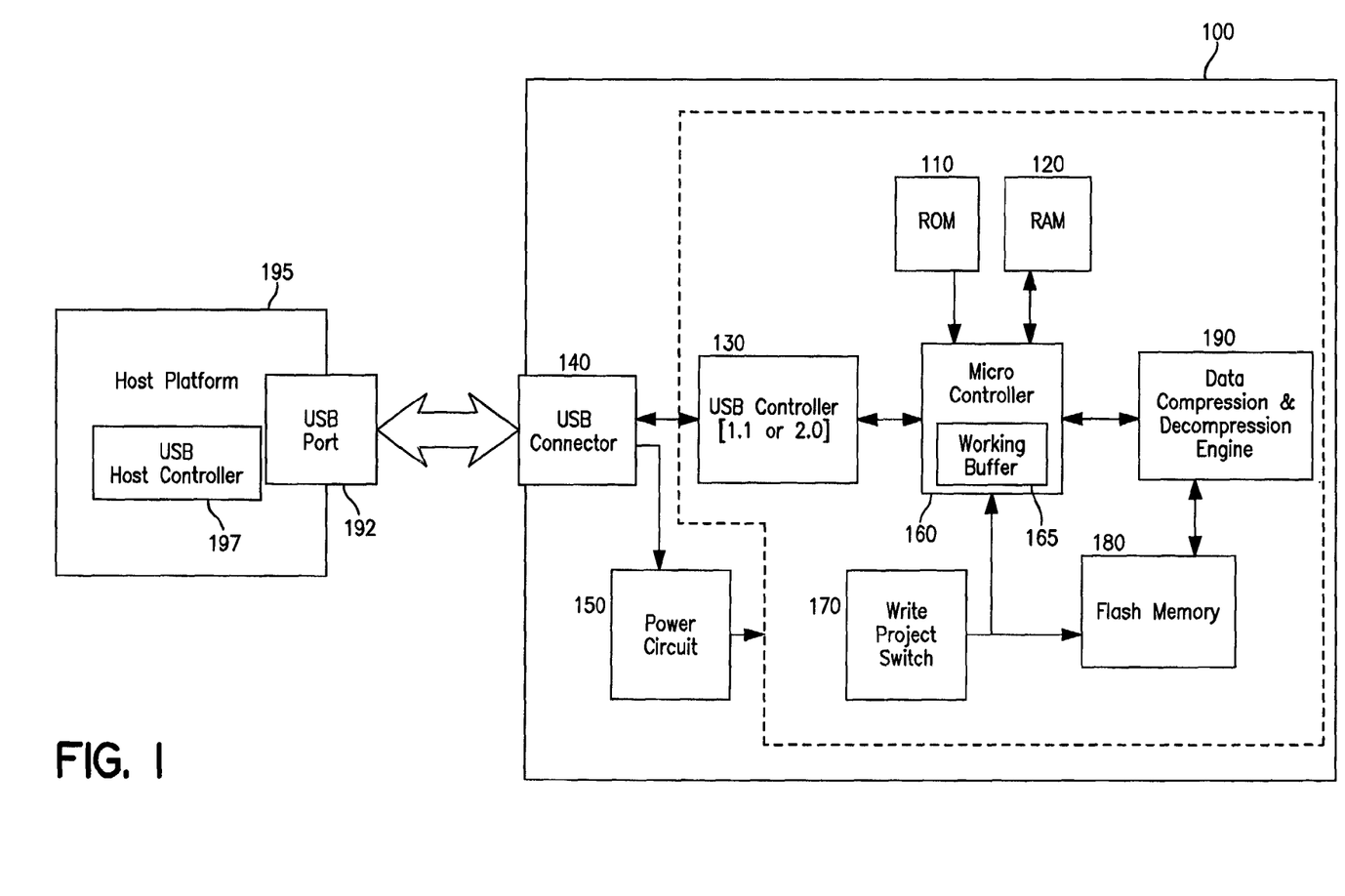
FIG. 1 is a block diagram illustrating functional blocks of one embodiment of the portable memory device according to the present invention and an illustrative configuration thereof.

FIG. 1 is a block diagram illustrating functional blocks of one embodiment of the portable memory device and system of the present invention and an illustrative configuration thereof. FIG. 1 shows a portable memory device 100 (a small handheld device capable of fitting substantially in a closed fist) that is connected via a universal serial bus (USB) plug, IEEE 1394 (i.e., Firewire) or similar port connector 140 to a USB port (or similar port) 192 of the host platform 195 (such as a personal computer). In the preferred embodiment, the connection is made without wire or cable interconnection. Host platform 195 is coupled to a power supply circuit 150 located in portable device 100. Power supply circuit 150 draws power from host platform 195 and serves as a power source for various components of portable device 100.

Referring still to FIG. 1, the portable memory device 100 includes a micro controller 160, flash memory 180, and a data compression/decompression engine 190. It is understood that micro controller 160 could also be a general purpose microprocessor.

In one embodiment, a working buffer 165 is located in the micro controller. In an alternative embodiment, the working buffer 165 is located outside of the micro controller 165 (e.g., in the RAM 110). In the preferred embodiment, the working buffer has 16 kilobytes of capacity.

It should be appreciated that data compression/decompression engine 190 maybe implemented in various ways within the scope of the present invention. In one embodiment, 40O compression/decompression engine 190 is implemented as firmware stored in a non-volatile memory 110 within portable device 100. In another embodiment, data compression/decompression engine 190 is implemented as part of micro controller 160. In still another embodiment, compression/decompression engine 190 is implemented as a processor separate from micro controller 160. In other words, within the scope of the present invention, compression/decompression engine 190 is not required to reside in a particular location in the portable device 100. Instead, where compression/decompression engine 190 is to be placed is a design choice, thus affording design flexibility to suit different applications in which the present invention can be utilized.

Data compression/decompression engine 190 compresses data after the data is transferred from the host platform 195 to the portable memory device 100. The data is transferred in the form of data packets passed along a USB bus. The data compression/decompression engine 190 retrieves the data from the working buffer 165 (typically one sector at a time) and compresses the data. In the preferred embodiment, the data is compressed to 50% of its original size. Thus a packet of 512 bytes of data will be compressed to 256 bytes. After compression, the data is stored to the flash memory 180. The compression/decompression engine 190 also decompresses data stored to the flash memory 180 and transfers the data to the host platform 195.

In this embodiment, the portable device includes a USB device controller 130, which serves to control the communication between portable device 100 and host platform 195, such as a USB-compatible PC having a USB host controller 197 therein.

With reference still to FIG. 1, portable device 100 also includes a volatile memory 120 and a non-volatile memory 110. In a preferred embodiment, volatile memory 120 is a random access memory (RAM) that serves as a working memory for micro controller 160 during its operation. Non-volatile memory 110 is a read-only memory (ROM) in this embodiment and can be used to store firmware that performs various functions of portable memory device 100.

Additionally, in this embodiment, portable device 100 includes a write-protect switch 170 which, when activated, triggers micro controller 160 to disable write-access to flash memory 180. It should be appreciated that write-protect switch 170, like compression/decompression engine 190, may be implemented in various ways within the scope of the present invention. For example, write-protect switch 170 can be implemented by software (e.g., firmware stored in a non-volatile memory), as part of micro controller 160, or as a processor unit separate from micro controller 160. In an alternative embodiment, the write-protect switch 170 can be a manual switch which is manually operated by the user.

In a currently preferred embodiment as illustrated in FIG. 1, microprocessor 160 controls various components of portable device 100, including USB device controller 130, ROM 110, and RAM 120 (and execution of firmware code stored therein).

Optionally, portable device 100 further includes a USB port (not shown) that is provided as a convenient feature that can be used to couple other USB-compatible device(s) to the portable device 100 via USB.

In one embodiment, driver software (not shown), application programming interface (API) (not shown) and monitoring software (not shown) reside in the host platform 195 and communicate with USB host controller 197 to facilitate the operation of portable device 100.

The architecture of a portable data storage device is described in U.S. Patent application entitled "A Portable Device Having Biometrics-Based Authentication Capabilities" with Ser. No. 09/898,365, filed on Jul. 3, 2001 and in U.S. Patent Application entitled "Portable Data Storage Device Capable of Being Directly Connected Via USB Plug to a Computer" with Ser. No. 09/803,173.

Figure 2:
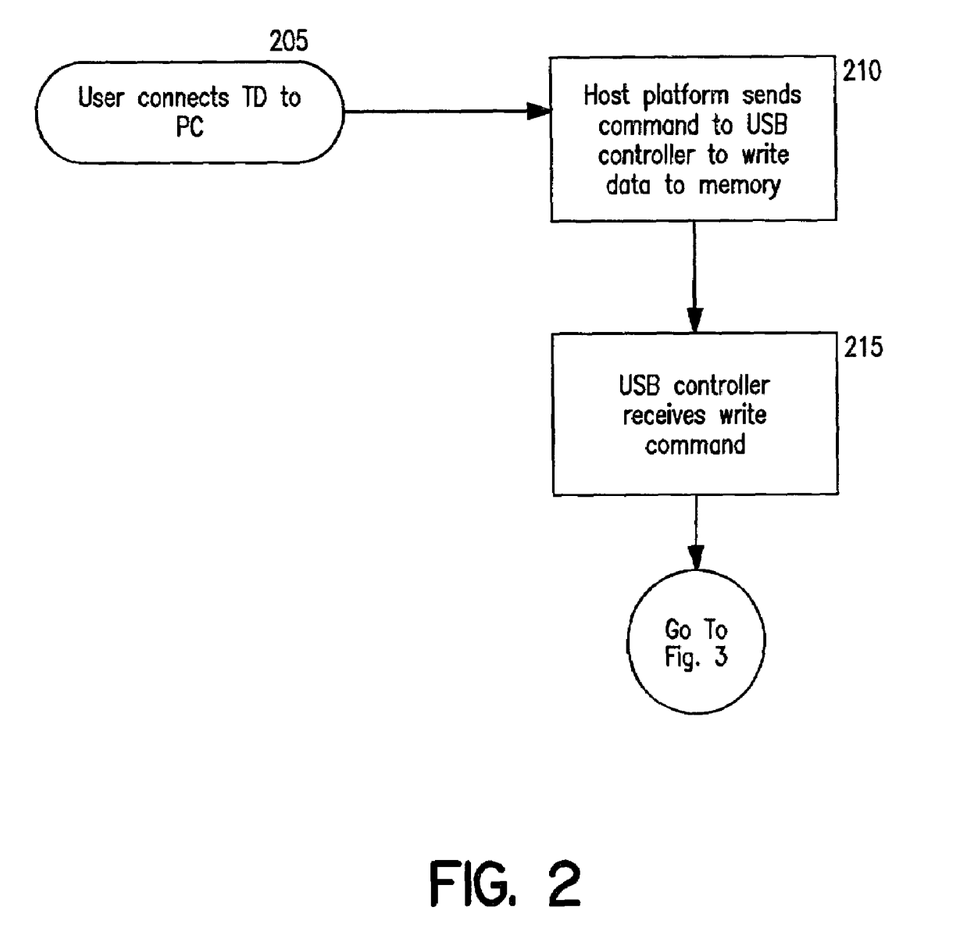
FIG. 2. illustrates a flow diagram that describes how the host platform communicates commands to the portable memory device.

FIG. 2 illustrates a flow diagram of the operation that occurs when the user connects the portable device 100 to the host platform 195 (step 205) and initiates the saving of data to the portable device 100. In step 205, upon being coupled to a host platform 195, portable device 100 undergoes an initialization procedure. In a currently preferred embodiment, the initialization procedure involves establishing communication with the host platform 195 and ensuring the host platform 195 is aware that portable device 100 has been coupled thereto. Host platform 195 requests services from portable device 100 by sending request packets to USB host controller 197. USB host controller 197 transmits packets through USB port 192 to USB connector 140. Portable device 100 then performs various operations such as reading, writing or erasing coupled with compressing and decompressing data from or to flash memory 180.

In step 210, host platform 195 may send a request to portable memory device 100 to write data to flash memory 180 in the form of a write command. In step 215, USB controller 130 receives write command. Write command typically indicates the number of packets of data to follow that are to be saved.

Figure 3:
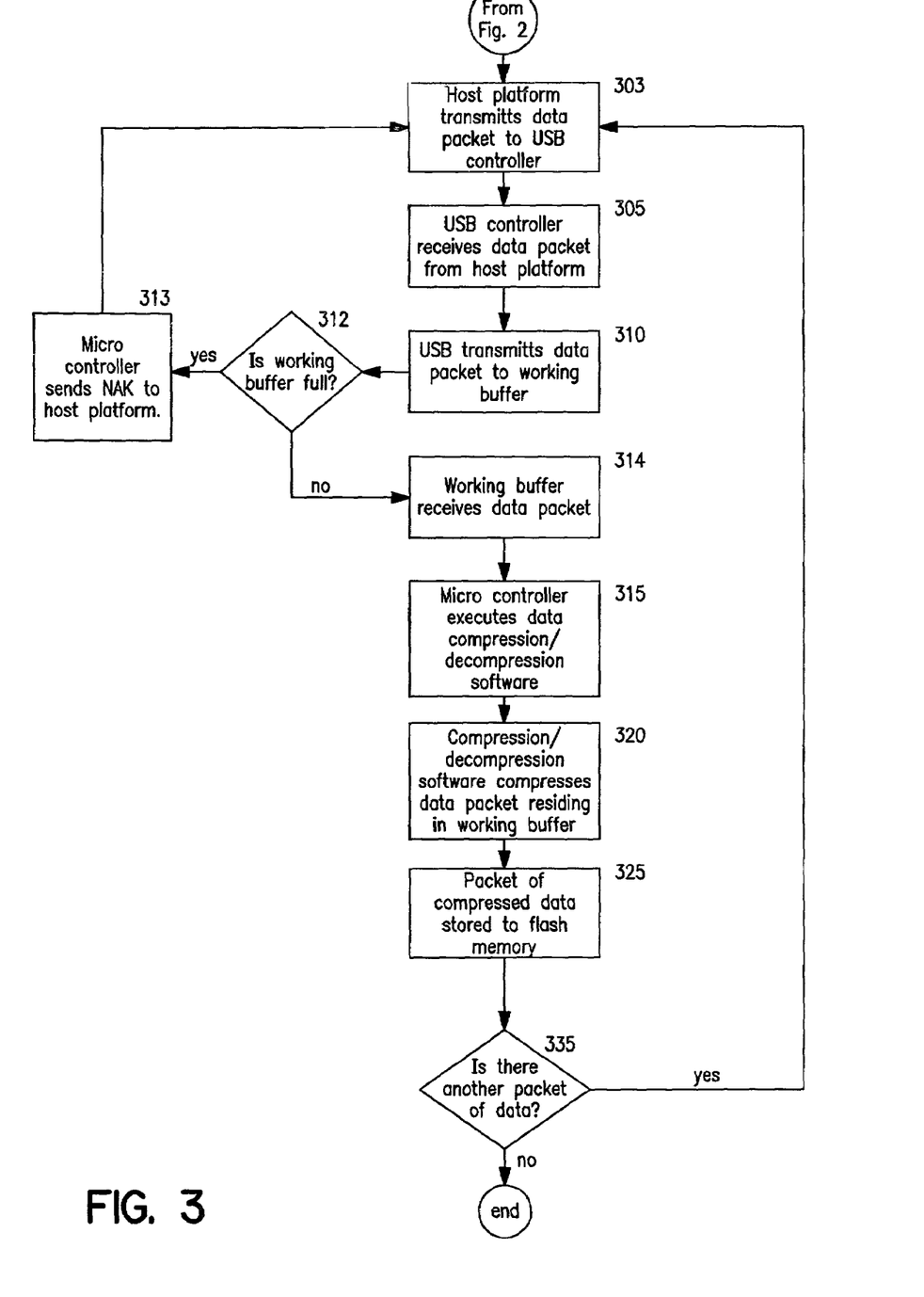
FIG. 3. illustrates a flow diagram that describes how data is transmitted, compressed and saved to the memory of the portable memory device.

FIG. 3 illustrates a flow diagram of the operation that occurs when data is transferred to the portable device to be compressed and written to the flash memory 180. Host platform 195 transmits a first data packet to USB controller 130 (step 303). In one embodiment, in accordance with the USB 2.0 standard, each data packet is the equivalent of one sector of memory or 512 bytes. In an alternative embodiment, in accordance with USB standard 1.1, each data packet is 64 bytes.

USB Controller 130 receives packet of data from host platform 195 (step 305). USB controller 130 transmits data packet to working buffer 165 (step 310). In the preferred embodiment, working buffer 165 can hold a maximum of 16 kilobytes of data. If working buffer 165 reaches maximum capacity and can no longer store additional data, then the next data packet may be rejected and a negative acknowledgement (NAK) communication is sent by micro controller 160 to host controller 195 indicating that the rejected data packet was not received (steps 312 and 313). Host controller 195 then retransmits rejected data packet (step 303). This process of packet rejection and retransmission continues until the working buffer 165 has capacity to accept an additional data packet (step 314).

Micro controller 160 executes data compression/decompression engine 190 (Step 315). Compression/decompression engine 190 operates on packets of data stored in working buffer 165 (Step 320) in a First In/First Out scheme whereby data packets are compressed in the order that they are stored to working buffer 165 with the first packet stored in working buffer 165 being the first to be compressed and transferred to flash memory 180. In the preferred embodiment, data is compressed to 50% of its original size. In the preferred embodiment, when operating on a USB 2.0 standard, compression engine 190 operates to compress one sector (512 bytes) of data at a time. In an alternative embodiment, when operating on the USB 1.1 standard, compression engine 190 operates to compress 64 bytes of data at a time. Compressed data is saved to flash memory 180 (Step 325).

Memory mapping is controlled by the micro controller 160. In the preferred embodiment, the host platform (and user) are unaware that the data is being compressed. To the host platform, data appears to fill sectors in the flash memory 180 as if the data were not compressed (i.e., 512 bytes of non-compressed data per sector). Thus compressed data written to the first sector would appear to the host controller to fill one entire sector. In reality, the data is compressed from 512 to 256 bytes and is saved to half the sector space that would be needed for the data had it not been compressed. Thus the second packet of data, after it is compressed from 512 bytes to 256 bytes, may also be saved to the first sector. To the host controller, the second data packet, which in reality is saved to the first sector, will appear to be saved to the second sector. Similarly, the first data packet saved to second sector will appear to be saved to the third sector and the second data packet saved to the second sector will appear to be saved to the fourth sector.

Typically standard 2 bit error detection and 1 bit correction mechanisms are employed.

If there is another packet of data, then host controller 195 transmits the packet of data to USB controller 130 (step 335 and 303). Data compression engine 190 continues to compress additional packets of data stored to working buffer 165 (step 320). When there are no more data packets to be compressed, then the data compression and storage session ends.

Figure 4:
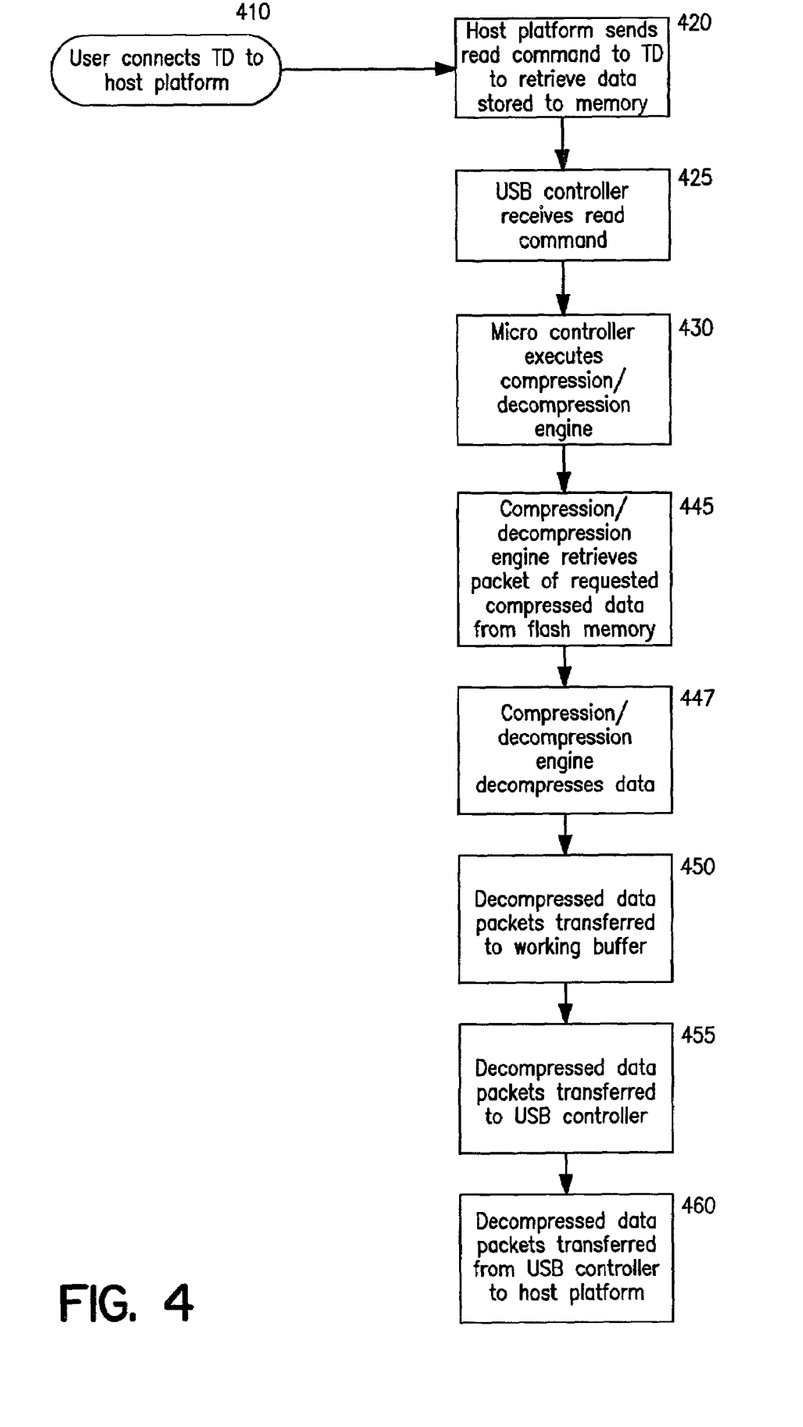
FIG. 4. illustrates a flow diagram that describes how compressed data saved to the memory of a portable memory device is accessed.

FIG. 4 illustrates the steps by which data is retrieved from the memory 180 of the portable memory device 100 and decompressed.

In step 410, user connects the portable device 100 to a host platform 195. In step 410, upon being coupled to a host platform 195, portable device 100 may undergo the initialization procedure described previously. Host platform 195 requests services from portable device 100 by sending request packets to USB host controller 197. USB host controller 197 transmits packets through USB port 192 to USB connector 140.

Host platform 195 may send a request to portable device 100 to read data requested by user (step 420) in the form of a read command. USB controller 130 receives the read command (step 425). Read command indicates the location of the data in the flash memory 180 and number of packets of data to be read. Because host platform 195 is unaware that data is compressed, the read command will request data that is not necessarily in the sector in which the host platform 195 believes it to be. For example, as discussed previously, the second data packet, which in reality is saved to the second half of the first sector, will appear to the host controller 195 be saved to the second sector. Similarly, the first data packet saved to second sector will appear to be saved to the third sector and the second data packet saved to the second sector will appear to be saved to the fourth sector. Thus, host platform's 195 data request may indicate that a particular packet of data is stored to the second sector, where in reality, it is stored to the second half of the first sector. To account for this, micro controller 160 operates to retrieve requested data from flash memory 180 in accordance with the manner in which it was saved (step 325).

In step 430, micro controller 160 executes data compression/decompression engine 190. Compression/decompression engine 190 retrieves packets of requested data from flash memory 180 (step 445). Compression/decompression engine 190 acts to decompress dates (step 447). Decompressed data is transferred to working buffer 165 (step 450). Decompressed data is transferred to USB controller 130 (step 455). In step 460, data packet is transferred to the memory (e.g., RAM) of the host platform 195.

Data compression/decompression engine 190 continues to retrieve and decompress data from flash memory 180 until all data requested has been decompressed and transferred to host platform 195.

Alternatively, host platform 195 may send a request to portable device 100 to read directory of data stored to flash memory 180. User can then view directory on host platform 195 to determine which data user wishes to retrieve from flash memory 180.

It is to be understood that the above description is only of the preferred embodiments of the invention. One skilled in the art may devise numerous other arrangements without departing from the spirit and scope of the invention. The invention is thus limited only as defined in the accompanying claims.

What is claimed is:

1. A unitary portable data storage device comprising:
   a universal serial bus (USB) plug integral to the storage device, the storage device capable of being directly connected to a USB port of a computer via the plug such that there is an immediate connection between the storage device and the computer without cable interconnection;
   a non-removable flash memory having a first storage capacity; and
   a data compression engine,
   wherein the data compression engine is capable of compressing data for storage in the flash memory so that the capacity of the flash memory exceeds the first storage capacity and the user thereof can manually enable and disable the compression engine.

2. The portable data storage device as in claim 1, further comprising a data decompression engine capable of decompressing data stored to the flash memory of the portable data storage device.

3. The portable data storage device as in claim 1 wherein the user thereof is not aware that the data is being compressed.

4. The portable data storage device as in claim 1 wherein the data is compressed to 50 percent of its original size.

5. The portable data storage device as in claim 1 wherein the flash memory can store therein compressed data, which when decompressed has a size that exceeds the first storage capacity by at least 100%.

6. A method of compressing and storing data, the method comprising the steps of:
   (a) directly connecting a portable data storage device to a communication port of a host platform via an integral universal serial bus (USB) plug such that there is an immediate connection between the storage device and the host platform without cable interconnection, the portable data storage device including a memory having a first storage capacity;
   (b) running a data compression engine residing on the portable data storage device;
   (c) compressing data provided by the host platform; and
   (d) saving the compressed data to the memory of the portable data storage device, wherein the capacity of the memory exceeds the first storage capacity and the user thereof can manually enable and disable the compression engine.

7. The method as in claim 6 wherein the user thereof is not aware that the data is being compressed.

8. The method as in claim 6 wherein the compressing step comprises compressing the data to 50 percent of its original size.

9. The method as in claim 6 further comprising the step of increasing the capacity of the memory such that the compressed data stored therein, when decompressed, has a size that exceeds the first storage capacity by at least 100%.

10. The method as in claim 6 wherein the device is small enough to be fitted substantially in a closed fist.

11. A method of decompressing data saved to the memory of a portable data storage device, the method comprising the steps of:
   (a) connecting the portable data storage device directly to a communication port of a host platform via an integral universal serial bus (USB) plug such that there is an immediate connection between the storage device and the host platform without cable interconnection, the portable data storage device including a memory having a first storage capacity and having stored therein compressed data, which when decompressed has a size that exceeds the first storage capacity;
   (b) running a data compression/decompression engine residing on the portable data storage device;
   (c) retrieving the compressed data from the memory of the portable data storage device;
   (d) decompressing the compressed data; and
   (e) transmitting the decompressed data to the host platform,
   wherein the user thereof can manually enable and disable the compression engine.

12. The portable data storage device as in claim 1 wherein the device is small enough to be fitted substantially in a closed fist.

13. The method as in claim 11 wherein the device is small enough to be fitted substantially in a closed fist.

* * * * *